No. 714,398. Patented Nov. 25, 1902.
G. D. ROSS.
MECHANISM FOR SHIFTING POINTS OF TRAMWAY LINES.
(Application filed July 11, 1902.)
(No Model.)

Witnesses:
L. Beymann
L. Waldman

Inventor:
George Dow Ross
by B. Singer atty.

UNITED STATES PATENT OFFICE.

GEORGE DOW ROSS, OF GLASGOW, SCOTLAND.

MECHANISM FOR SHIFTING POINTS OF TRAMWAY-LINES.

SPECIFICATION forming part of Letters Patent No. 714,398, dated November 25, 1902.

Application filed July 11, 1902. Serial No. 115,205. (No model.)

*To all whom it may concern:*

Be it known that I, GEORGE DOW ROSS, engineer, of 12 Regent Park Terrace, Strathbungo, Glasgow, Scotland, a subject of the King of Great Britain, have invented certain new and useful Improvements Connected with Mechanism for Shifting the Points of Tramway-Lines, of which the following is a specification.

Various methods have been proposed for shifting the points of tramway-lines from or by the tram-car. In the specification of my prior patent, No. 701,398, dated June 3, 1902, I have described a very simple and efficient method of automatically shifting the tramway-points from the car as the latter moves along.

A drawback in connection with the shifting mechanisms heretofore proposed is that no provision has been made for preventing the shifting apparatus breaking should a stone or such like find its way into the rail and jam the point so as to prevent its shifting. This is a very serious drawback, as it is impossible to prevent stones or other obstructions getting now and then into the groove of the rail.

The present invention has for its object to obviate the above drawback by providing a simple appliance or attachment which can be fitted in connection with the point-shifting apparatus and which will should a stone jam the point allow the apparatus to work without shifting the point and without fear of any of the parts of the apparatus being damaged or broken.

The invention can be carried out in various ways; but I prefer a spring arrangement which is so made and fitted that normally it will act as part of the shifting lever or rod and shift the point; but should the point jam from any cause it will yield sufficiently to let the apparatus work without shifting the point.

In order that the invention may be properly understood, I have hereunto appended explanatory drawings, which show, in—

Figure 1:
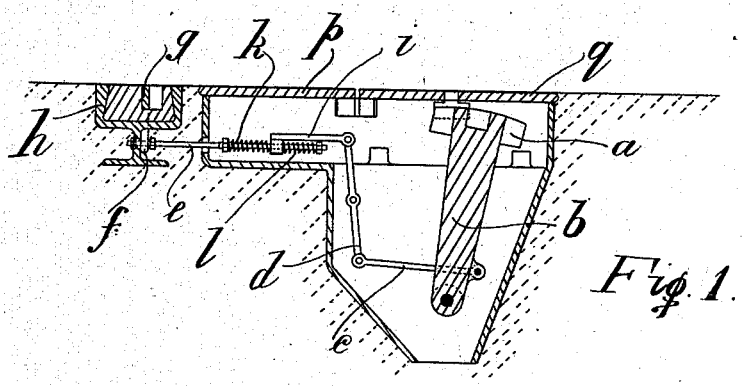
Figure 2:
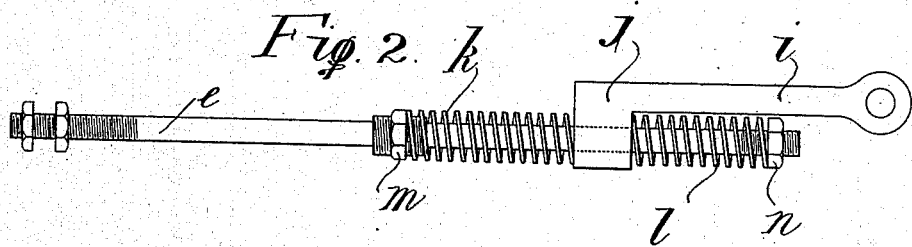
Figure 3:
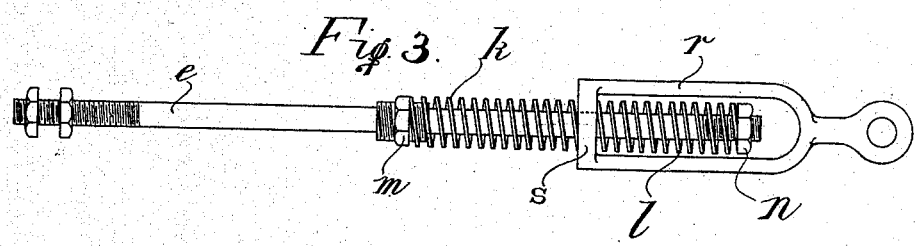
Figure 4:
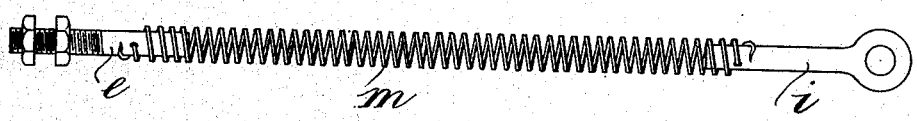

Figure 1, a complete point-shifting device in section; Fig. 2, one form of my present invention; Figs. 3 and 4, other forms of the invention.

In the arrangement shown at Figs. 1 and 2 the point-shifting table $a$ and rocking arm $b$, operated from the car and which may both be the same as in my prior patent aforesaid, are connected, by means of a link $c$, to a rocking lever $d$, which is jointed to the connecting-rod $e$, which latter is attached to the tongue $f$ of the switch-point $g$ in the groove of the tram-rail $h$. The connecting-rod $e$ is made in two parts $e\ i$, the one part $e$ passing through an eye in a lug $j$ on the other part $i$. On the part $e$ there are two strong springs $k\ l$, which are coiled around the part and bear at their inner ends against the lug aforesaid and at their outer ends against nuts $m\ n$ on the part. The nuts $m\ n$ can be screwed up to regulate the tension of the springs.

The mechanism may be inclosed in a box $o$, provided with removable covers $p\ q$ and sunk into place in the roadway and between the tram-rails.

In the arrangement Fig. 3 the part $e$ of the connecting-rod works through a hole in a stirrup-piece $r$, jointed to the lever $d$. The springs $k\ l$ bear against the bridge $s$ of the stirrup.

In the arrangement Fig. 4 the two parts $e\ i$ of the connecting-rod are simply joined together by a stiff spring $m$.

In all cases the springs $k\ l$ are made of such strength that when the apparatus is working properly they will be stiff enough to shift the point $g$ without yielding to any appreciable extent; but when the point jams they will yield to such an extent as to allow the parts $a\ b\ c\ d\ i$ to work without shifting the point.

When a single spring is used, as at Fig. 4, it is made sufficiently stiff to ordinarily shift the point without compressing or expanding to any appreciable extent. When the point is jammed, it will yield sufficiently to allow the car to operate the table $a$ without operating the point.

Having now fully described my invention, what I claim, and desire to secure by Letters Patent, is—

A device of the type set forth, comprising a rocking table adapted to be operated from the car, an arm connected to the table, a link connected at its one end to said arm, a rocking lever having its lower end connected to the other end of said link, a connecting-rod formed in two parts, one of the parts having a connection with the switch-point, the other of the parts being pivotally connected at its one end to the upper end of said rocking lever and having its other end slidably mounted on said first-named part, nuts suitably spaced on said first-named part, and springs on said first-named part engaging said last-named end of the second-named part and said nuts.

Signed at Glasgow, Scotland, this 19th day of June, 1902.

GEORGE DOW ROSS.

Witnesses:
WILLIAM GALL,
W. D. FITZPATRICK.